US011243906B2

(12) United States Patent
Stratman (10) Patent No.: US 11,243,906 B2
(45) Date of Patent: Feb. 8, 2022

(54) DRAG AND DROP FORMAT CONVERSION BETWEEN APPLICATIONS

(71) Applicant: OSAAP America, LLC, Chelmsford, MA (US)

(72) Inventor: Holger Stratman, Castrop-Rauxel (DE)

(73) Assignee: OSAAP America, LLC, Chelmsford, MA (US)

( * ) Notice: Subject to any disclaimer, the term of this patent is extended or adjusted under 35 U.S.C. 154(b) by 44 days.

(21) Appl. No.: 16/230,160

(22) Filed: Dec. 21, 2018

(65) Prior Publication Data
US 2020/0192863 A1 Jun. 18, 2020

Related U.S. Application Data

(60) Provisional application No. 62/779,872, filed on Dec. 14, 2018.

(51) Int. Cl.
*G06F 16/11* (2019.01)
*G06F 3/0484* (2013.01)
(Continued)

(52) U.S. Cl.
CPC .......... *G06F 16/116* (2019.01); *G06F 3/0486* (2013.01); *G06F 3/04845* (2013.01); *G06F 16/955* (2019.01); *G06F 30/00* (2020.01)

(58) Field of Classification Search
CPC ...... G06F 16/116; G06F 16/955; G06F 30/00; G06F 3/04845; G06F 3/0486
See application file for complete search history.

(56) References Cited

U.S. PATENT DOCUMENTS 6,002,402 A 12/1999 Schacher
6,353,892 B2 3/2002 Schreiber et al.
(Continued)

FOREIGN PATENT DOCUMENTS

EP 1188125 B1 3/2003

OTHER PUBLICATIONS

"Drag and Drop Overview", https://docs.microsoft.com/en-us/dotnet/framework/wpf/advanced/drag-and-drop-overview, Mar. 29, 2017, pp. 1-13.
(Continued)

*Primary Examiner* — Ashish Thomas
*Assistant Examiner* — Dustin D Eyers
(74) *Attorney, Agent, or Firm* — Banner & Witcoff, Ltd.

(57) ABSTRACT

According some aspects, a user may drag an image displayed in a web browser application displaying the tool supplier's web site to a CAD application. Program logic associated with the CAD application may process arguments in the drag and drop event to determine a first resource identifier associated with the image, such as an image URL. The event handler may replace an image file type extension with a CAD file type extension to generate a second resource identifier, such as by replacing the image file type extension with a file type extension associated with a CAD stencil file. The CAD application may attempt to use the second resource identifier to download a CAD file, such as a CAD stencil file, corresponding to the product depicted in the image. The CAD file may be used to generate a CAD drawing comprising a stencil and/or other schematic depiction of the product.

20 Claims, 4 Drawing Sheets

(51) Int. Cl.
*G06F 16/955* (2019.01)
*G06F 3/0486* (2013.01)
*G06F 30/00* (2020.01)

(56) References Cited

U.S. PATENT DOCUMENTS

| | | |
|---|---|---|
| 6,721,951 B1 | 4/2004 | Williams et al. |
| 6,772,139 B1 | 8/2004 | Smith, III |
| 6,952,281 B1 | 10/2005 | Irons et al. |
| 7,089,502 B2 | 8/2006 | Nakajima et al. |
| 2004/0250236 A1* | 12/2004 | O'Malley ............... G06F 30/00 717/104 |
| 2007/0094263 A1* | 4/2007 | Tessman, Jr. ....... H04L 63/0428 |
| 2007/0183741 A1 | 8/2007 | Lerman et al. |
| 2008/0109712 A1 | 5/2008 | McBrearty et al. |
| 2008/0184148 A1 | 7/2008 | Selig |
| 2008/0297847 A1* | 12/2008 | Yamazaki ............... G06F 30/00 358/1.15 |
| 2009/0164564 A1 | 6/2009 | Willis |
| 2009/0172011 A1* | 7/2009 | Onomura ............. H04N 9/8047 |
| 2014/0229976 A1* | 8/2014 | Ma ..................... H04N 21/8456 725/32 |
| 2018/0020034 A1 | 1/2018 | Hundemer et al. |

OTHER PUBLICATIONS

"My Case Builder", 2011-2018 Century Service Affiliates, Inc.—MyCaseBuilder, https://mycasebuilder.com/, site accessed Dec. 21, 2018.

Jan. 24, 2020—PCT/US2019/061350—ISR & WO.

\* cited by examiner

```
/// Convert file type of dragged image file identifier to CAD stencil identifier 1    function dropHandler (DropEventArgs e)
2    {
3         if (EscapeCondition)
4         {
5              return;
6         }
7
8         string FileName = e.GetData() as string;
9
10        if (FileName.EndsWith ("tool")
11        {
12             DownloadFile (FileName, DownloadedFile);
13             GenerateDrawing (DownloadedFile);
14        }
15
16        if (FileName.EndsWith ("jpg")
17        {
18             string ToolName = FileName.Replace ("jpg", "tool");
19             try
20             {
21                  DownloadFile (ToolName, DownloadedFile);
22                  GenerateDrawing (DownloadedFile);
23             }
24             catch
25             {
26                  ///tool file was not available at the server
27             }
28        }
29        return;
30   }
```

FIG. 4

DRAG AND DROP FORMAT CONVERSION BETWEEN APPLICATIONS

CROSS-REFERENCE TO RELATED APPLICATIONS

This application claims priority to U.S. Provisional Patent Application No. 62/779,872, entitled "Drag and Drop Format Conversion Between Applications," filed Dec. 14, 2018, which is hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to computer software and computer-aided design applications. More specifically, aspects of the disclosure provide methods and techniques for allowing designers the ability to drag and drop tool image files from a tool supplier's website to a CAD application, and automatically retrieve a corresponding secondary design file.

BACKGROUND

Hardware tools and other components are an essential part of many trades. Organizing a set of tools can be important in many industries. For example, it may be important to ensure that all tools and/or parts are accounted for before leaving a job site. Some tools are very expensive, and their loss may necessitate expensive replacement costs. In other instances, tools may be left behind in areas that could disturb normal machine functioning (such as a wrench left behind in a jet engine). Shadow boards have been created to help organize a hardware tool set. One type of shadow board is a foam inlay for a carrying case, having cutout locations for each tool in the set. These inlays have many commercial uses from protecting sensitive equipment to product packaging.

In order to protect and organize the tools, the dimensions and shape of the cutouts in the foam inlay should match those of the tools in the set. Thoughtful layout of the shadowboard may assist users with organizing, accounting for, and protecting tool sets during transport and storage. Computer-aided design (CAD) applications may be used to design layouts for shadowboards. Users may add stencils to a CAD drawing to create a layout for cut outs in a foam inlay. Stencils may be provided by a tool manufacturer, or may be generated by the CAD program or a designer based on information about the tool. A CAD drawing, laying out the location of the cutouts in the shadow board, may be used to produce the foam inlay.

Consumers are increasingly purchasing tools and other components via online web sites. Using a web browser application, consumers can access a wide range of tool options and select the right tools for their particular needs. These web sites, which the consumers can use to purchase the tools, typically comprise images and descriptive text associated with the tool. A consumer can select a tool for purchase and build a custom tool set. If the consumer wants to organize the custom tool set using a shadow board, typically the consumer must have a shadow board designed for the custom tool set. Images on the web site advertising the tool are typically unsuitable for use in designing shadow boards without substantial addition processing and/or designer analysis. Thus, some tool manufacturers may separately provide stencil files for their tools for consumer use in CAD applications.

One problem presented by existing solutions is that consumers must separately identify the image of the tool and the stencil file associated with the tool. A further problem is facilitating communication between the web browser application used to purchase tools and the CAD application used to design a shadow board for a custom tool set. Aspects described herein may address these and other problems, and generally improve the quality, efficiency, and speed of CAD systems by offering an improved user experience and reducing the number of steps with respect to generating shadow boards for custom tool sets.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may relate to methods and techniques for allowing designers the ability to drag and drop tool image files from a tool supplier's website to a CAD application, and automatically retrieve a corresponding secondary design file (e.g., a CAD stencil). In particular, some aspects herein may facilitate the design of shadow boards by allowing users to drag images from a web browser application to a CAD application. The CAD application may automatically add a stencil corresponding to the product to the shadow board, and users may be able to more efficiently create shadow board designs.

A user may drag an image displayed in a web browser application displaying a tool supplier's web site to a CAD application. Program logic associated with the CAD application, such as a drag and drop event handler (e.g., an event handler configured to handle receipt of the drag and drop event by the CAD application), may process arguments in the drag and drop event to determine a first resource identifier associated with the image, such as an image URL. The event handler may determine that the first resource identifier indicates an image file type resource based on a file extension in the first resource identifier. The event handler may replace the image file type extension with a CAD file type extension to generate a second resource identifier, such as by replacing the image file type extension with a file type extension associated with a CAD stencil file (e.g., an OSAAP .tool extension). The CAD application may attempt to use the second resource identifier to download a CAD file, such as a CAD stencil file, corresponding to the product depicted in the image. The CAD file may be used to generate a CAD drawing comprising a stencil and/or other schematic depiction of the product.

Thus, some aspects may provide a first computer-implemented method to automatically retrieve a corresponding secondary file, by a first application, in response to a user dragging a displayed resource from a second application. The method may comprise intercepting, by the first application, a drag and drop event in response to an image resource used in the second application being dragged to the first application. The image resource may correspond to a first product. The first application may determine, based on the drag and drop event, a first resource identifier associated with the image resource. The first application may replace a first file type of the first resource identifier with a second file type associated with the first application to generate a second resource identifier. The first application may retrieve, in response to the drag and drop event, a second resource based on the second resource identifier, wherein the second resource comprises information in the second file type that corresponds to the first product.

In some implementations, the first application may be a computer-aided design (CAD) application. The first file type may be an image file type, and the second file type may be a computer-aided design (CAD) file type. The second resource may comprise a stencil that corresponds to the first product. The method may further comprise the first application generating, automatically based on retrieving the second resource, a CAD drawing comprising at least one element corresponding to the first product.

In some embodiments, the second application may be a web browser application. The first resource identifier and the second resource identifier may each be uniform resource locators (URLs). The image resource may be stored on a first server and the second resource may be stored on the first server. The image resource and the second resource may be stored in a same directory location on the first server.

In some implementations, the method may further comprise registering, by the first application, a drop event handler associated with the drag and drop event. Intercepting the drag and drop event may comprise intercepting, by the drop event handler associated with the first application, the drag and drop event.

More particularly, some aspects described herein may provide a second computer-implemented method to automatically retrieve a corresponding stencil resource, by a CAD application, in response to a user dragging a displayed image resource from a web browser application. The CAD application may intercept a drag and drop event in response to an image resource used in a web browser application being dragged to the CAD application, wherein the image resource corresponds to a first product. The CAD application may determine, based on the drag and drop event, a first uniform resource locator (URL) associated with the image resource. The CAD application may replace a first file type of the first URL with a second file type associated with the CAD application to generate a second URL. The CAD application may retrieve, in response to the drag and drop event, a stencil resource corresponding to the first product based on the second URL. And the CAD application may generate, automatically based on retrieving the stencil resource, a CAD drawing comprising at least one element corresponding to the first product.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for allowing designers the ability to drag and drop tool image files from a tool supplier's website that also provides a CAD stencil file (or other secondary design file), such as an OSAAP Tool file (.tool). According to some aspects, these methods and techniques may be implemented within a CAD application and may not require specialized programming on the tool supplier's web site. By supplying the CAD stencil in the same location as image resources on the page (or in some other location having a known relationship), the tool supplier may enable easy integration with CAD applications embodying one or more aspects described herein. In particular, some aspects herein may facilitate the design of shadow boards by allowing users to drag images from a web browser application to a CAD application, where a CAD stencil file associated with the product depicted in the image is automatically retrieved by the CAD application.

In some implementations a tool supplier's web site may provide images of tools, components, parts, and other objects that are for sale. For example, a page of the web site corresponding to a particular screwdriver may include a picture of that screwdriver. Pictures and images may be in any suitable format, such as .jpg, .png, and others. The image files corresponding to the pictures may be stored on a server associated with the tool supplier's web site. The tool suppliers may also provide secondary design files, such as a CAD stencil file (e.g., an OSAAP .tool file), corresponding to the tools on the web site. For example, in addition to storing a picture of the particular screwdriver, the tool supplier's web site may also store a CAD stencil file corresponding to the screwdriver.

According to one or more aspects described herein, a user may drag an image displayed in a web browser application displaying the tool supplier's web site to a CAD application. Program logic associated with the CAD application, such as a drag and drop event handler (e.g., an event handler configured to handle receipt of the drag and drop event by the CAD application), may process arguments in the drag and drop event to determine a first resource identifier associated with the image, such as an image URL. The event handler may determine that the first resource identifier indicates an image file type resource based on a file extension in the first resource identifier. The event handler may replace the image file type extension with a CAD file type extension to generate a second resource identifier, such as by replacing the image file type extension with a file type extension associated with a CAD stencil file (e.g., an OSAAP .tool extension). The CAD application may attempt to use the second resource identifier to download a CAD file, such as a CAD stencil file, corresponding to the product depicted in the image. The CAD file may be used to generate a CAD drawing comprising a stencil and/or other schematic depiction of the product.

Before discussing these concepts in greater detail, however, several examples of a computing device that may be used in implementing and/or otherwise providing various aspects of the disclosure will first be discussed with respect to FIG. 1.

Figure 1:
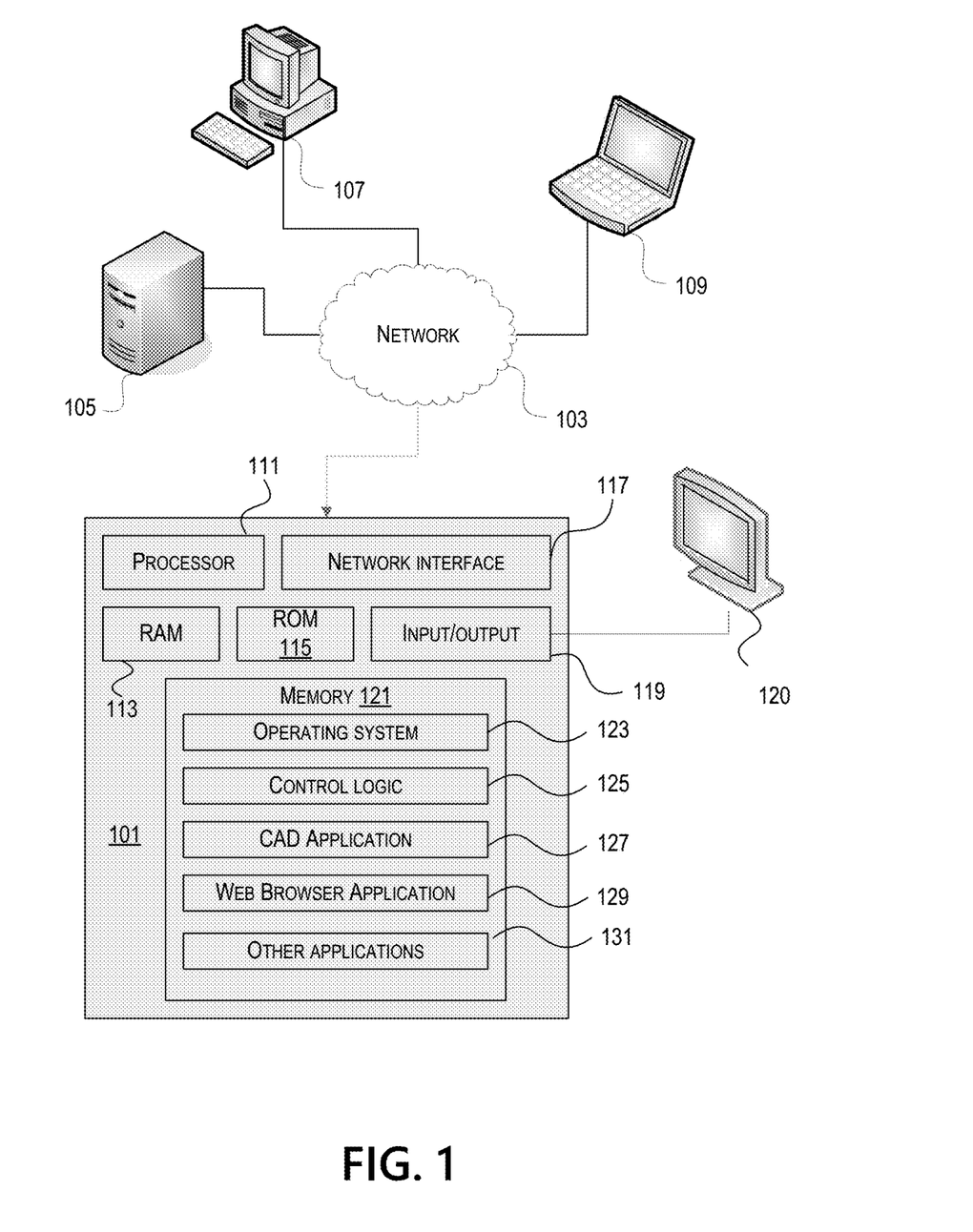
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, computer-aided design (CAD) application 127, web browser application 129, and other applications 129. Control logic 125 may be incorporated in and may be a part of CAD application 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for performing a file-type conversion during a drag and drop operation from a first application to a second application.

Figure 2:
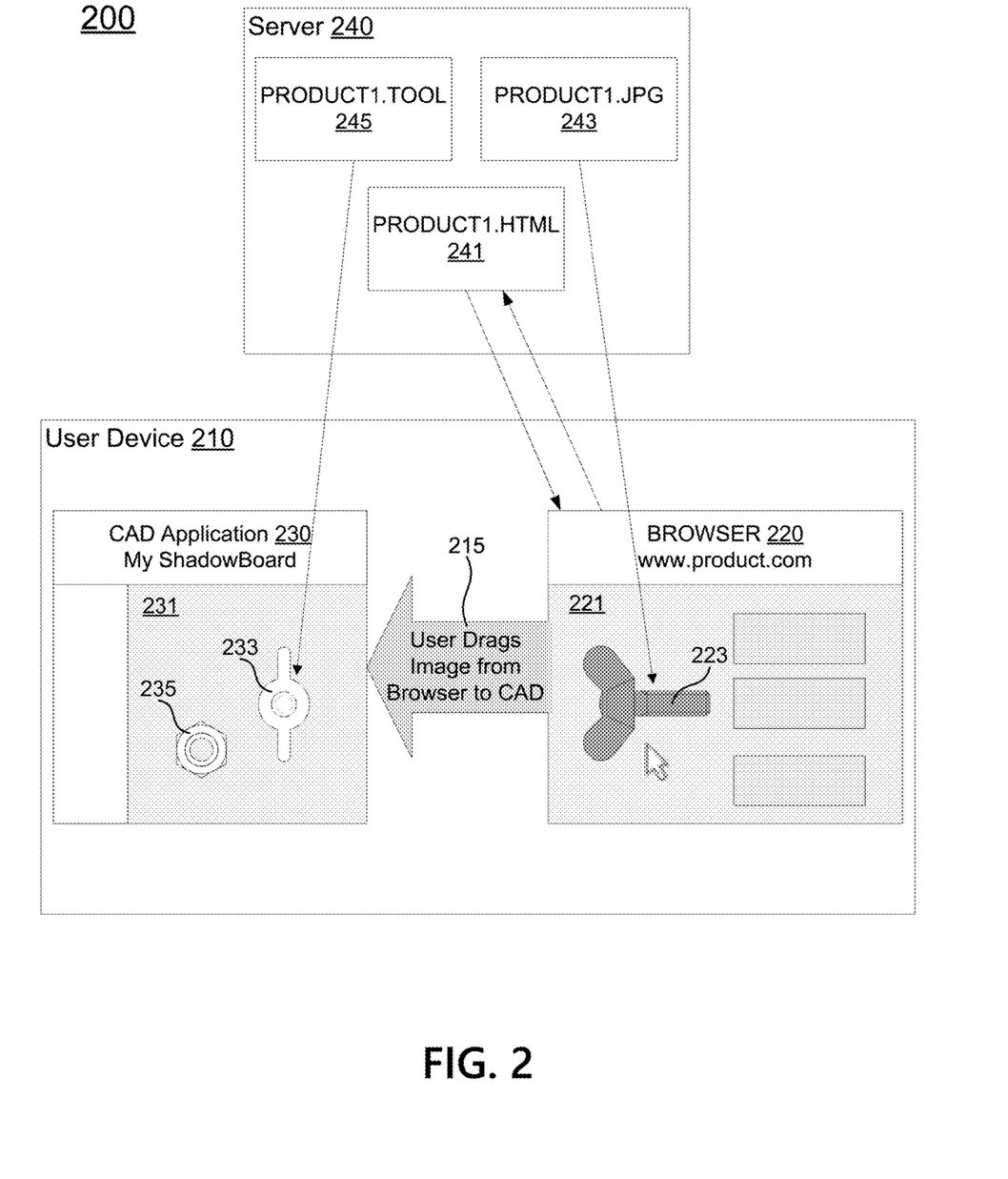
FIG. 2 depicts an example computing environment, including an interplay between two applications on a user device, that may be used in implementing one or more aspects of the disclosure.

FIG. 2 illustrates an example computing environment 200, comprising a user device 210 and a server 240, in which one or more aspects described herein may be implemented. User device 210 and server 240 may each be implemented in on or more computing devices, such as computing devices 101, 105, 107, and 109 of FIG. 1. User device 210 and server 240 may be in communication over a network, such as the Internet.

User device 210 may provide a web browser application 220 (also referred to as browser 220) allowing a user to retrieve, view, and interact with web pages. In particular, browser 220 may receive user input comprising a uniform resource locator (URL) of a web page. Examples of web browser application 220 include Microsoft's INTERNET EXPLORER, Google's CHROME, Apple's SAFARI, and Mozilla's FIREFOX. Browser 220 may retrieve the web page and render its content for display to the user. For example, browser 220 may be used to access a tool supplier's web site (e.g., at www.product.com). A user may navigate through the web site, and request a web page corresponding to a first product (such as a particular screwdriver), e.g., PRODUCT1.HTML 241. The browser 220 may retrieve and display a rendered view of PRODUCT1.HTML 241 in response to the user's navigation. The hypertext markup language (HTML) code for the page may include an embedded image 223, such as through reference to PRODUCT1.JPG 243. The reference may take the form of a URL, such as "https://www.product.com/product1.jpg," which describes the location of the image file 243 on the server 240. The URL of the image within the HTML code may be relative (e.g., specifying a file name or path with reference to the location of the page 241 on the server 240) and/or absolute (e.g., specifying a full file name or path used to access the image). Images may be in any suitable format, such as .jpg, .png, .gif, .bmp, and others. As part of preparing the rendered display of the page for the first product, the browser 220 may retrieve the image resource 243 from the server 240. The retrieved image 223 may be displayed in web browser application 220.

User device 210 may also provide a computer-aided design (CAD) application 230. CAD application 230 may be used to generate CAD drawings, such as a shadow board layout 231 for a tool set. Examples of CAD applications include Microsoft VISIO and OSAAP's BLUE SHADOW CAD DESIGNER. Shadow board layout 231 may comprise stencils and other schematic designs corresponding to hardware tools, components, and other parts. For example, stencil 235 may correspond to a tool that the user has added to the shadow board layout 231. A user accessing web page 221 in browser 220 may be interested in adding a first product depicted on that webpage to a shadow board 231 corresponding to a tool set being designed in CAD application 230. As part of this design, the user may add a stencil or other schematic corresponding to the first tool to the shadow board 231. This may require the user to locate a CAD file, such as a CAD stencil (e.g., an OSAAP .tool file).

A manufacturer of the first product may make CAD files, such as CAD stencils, available through their own web site and/or other means. The tool supplier may also make the CAD files, such as PRODUCT1.tool, available through their web site. For example, the tool supplier may provide a link on page 221/241 to download the CAD stencil. But providing the stencil separately from the product image may be confusing to users and may complicate the product page.

According to some aspects, CAD application 230 may comprise program logic allowing users to automatically import CAD file 245 into CAD application 230 based on dragging 215 image 223 from displayed web page 221 to CAD application 230. The program logic may comprise an event handler registered by CAD application 230 with the operating system to handle drag and drop events that target CAD application 230. The user may click and hold on image 223, and drag image 223 to CAD application 230 in drag operation 215. An operating system of user device 210 may utilize an event model to provide the drag and drop user input to CAD application 230. The operating system may create a drag and drop event comprising parameters indicating information about drag operation 215. The parameters may indicate a file name of the image, a file type of the image, and/or a URL of the image, among other information about drag operation 215.

The drag and drop program logic of CAD application 230 may intercept the drag and drop event and handle processing of the user input. The event handler may transform the URL of the image resource 243, as included in the event parameters, to generate a URL of the secondary design file 245 associated with the same product, such as the CAD stencil indicating the dimensions and shape of the product. CAD application 230 may retrieve the secondary design file 245, such as PRODUCT1.tool from server 240. In some implementations, CAD file 245 and image resource 243 may be stored in a same directory location on server 240. Implementation of this drag and drop process is described further below with respect to FIG. 3.

Figure 3:
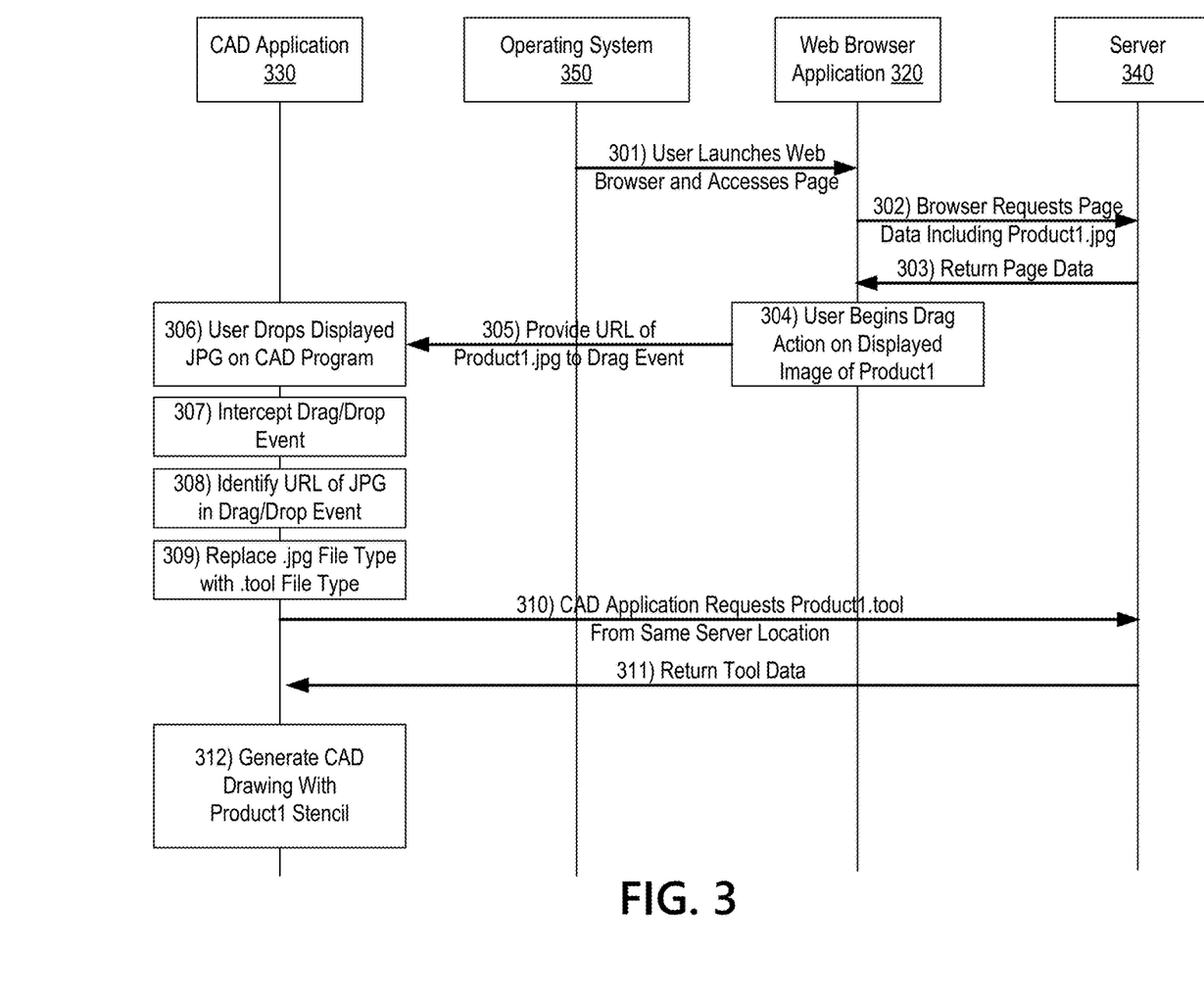
FIG. 3 depicts a system flow diagram that illustrates a method of drag and drop format conversion between applications in accordance with one or more illustrative aspects discussed herein.

FIG. 3 depicts a system flow diagram illustrating operation according to some aspects of the disclosure. The illustrated system comprises web browser application 320, CAD application 330, server 240, and operating system 350. Web browser application 320 (which may correspond to browser 220), CAD application 330 (which may correspond to CAD application 230), and operating system 350 may be provided by a user device, such as user device 210 discussed above with respect to FIG. 2. Server 340 may correspond to server 240, and may be a server associated with a web site provided by a tool supplier regarding a first product.

At step 301, a user may launch the web browser application 320 via operating system 350. The user may provide input to the web browser application 320 directing it to access the tool supplier's web page corresponding to the first product. For example, the user could direct browser 320 to access "http://www.product.com/product1.html." At step 302, the browser 320 may request the web page. As part of the process of requesting and rendering the web page, browser 320 may request additional information referenced within the HTML data of the web page, such as an image corresponding to the first product. The image data may be located in a file named Product1.jpg and available via the URL "/product1.jpg" (relative) or "http://www.product.com/product1.jpg." At step 303, server 340 may return the page data and browser 320 may display the page including product1.jpg.

At step 304, the user may begin a drag and drop operation by clicking and holding on the display of product1.jpg. The user may drag the displayed image from web browser application 320 to CAD application 330 to indicate that the user wants to move the information from browser 320 to CAD application 330. At step 306, the user may drop the dragged image on CAD application 330. Based on the user's drag and drop input, operating system 350 and/or web browser application 320 may generate a drag and drop event comprising parameters indicating the nature of the moved data. For example, the drag and drop event parameters may comprise one or more of: the image data, a file name of the image, a file type of the image, a relative URL of the image, an absolute URL of the image, a local reference to a locally stored copy of the image, and the like. In particular, at step 305 the operating system 350 and/or browser 320 may provide a URL of product1.jpg as a drag and drop event parameter.

At step 307, program logic associated with CAD application 330, such as a drop event handler, may intercept the drop event for CAD application 330. At step 308, the program logic may identify the URL of the image in the drag and drop event parameters. Optionally, the event handler may determine a file type of the data in the drag and drop event parameters. For example, if the file type is already a suitable secondary design file, such as a CAD stencil (e.g., an OSAAP .tool file), then CAD application 330 may simply retrieve the indicated file. But if the file type is not a suitable secondary design file, such as where the file type indicates that the dragged file is an image or other non-CAD design file, the system may proceed to step 308.

At step 309, the program logic (e.g., event handler) may process and transform the URL to generate a second URL that identifies an associated secondary design file. As noted above, in some implementations the tool supplier may store both .jpg files and corresponding .tool files for products in a same directory location on server 240. In this instance, the event handler may replace the .jpg file type extension in the URL with a .tool file type extension (or other suitable file type extension of a secondary design file/CAD file). In this example, the URL of the dragged image resource ("http://www.product.com/product1.jpg") may be transformed to the URL of the corresponding .tool file ("http://www.product.com/product1.tool"). As another example, the tool supplier may store image resources in a first folder and their corresponding secondary design files in a second folder. The event handler, in this instance, may replace both the file type extension and a keyword folder part of the URL to obtain the second URL of the associated secondary design file. For example, CAD application 330 may process the URL for the image resource at "http://www.product.com/images/product1.jpg" to generate a URL for the corresponding .tool file as "http://www.product.com/CAD/product1.tool."

At step 310, CAD application 330 may request the secondary design file using the secondary URL. For example, CAD application 330 may request product1.tool from the same directory location on server 340. Data corresponding to the requested secondary design file, e.g. CAD stencil data or other schematic, may be returned by server 340 in step 311.

At step 312, CAD application may generate a CAD drawing comprising the stencil/schematic corresponding to the product based on the retrieved secondary design file. As a result, the CAD drawing may include a stencil/schematic corresponding to the product displayed on the web page based on user input dragging the displayed image from web browser application 320 to CAD application 330.

Figure 4:
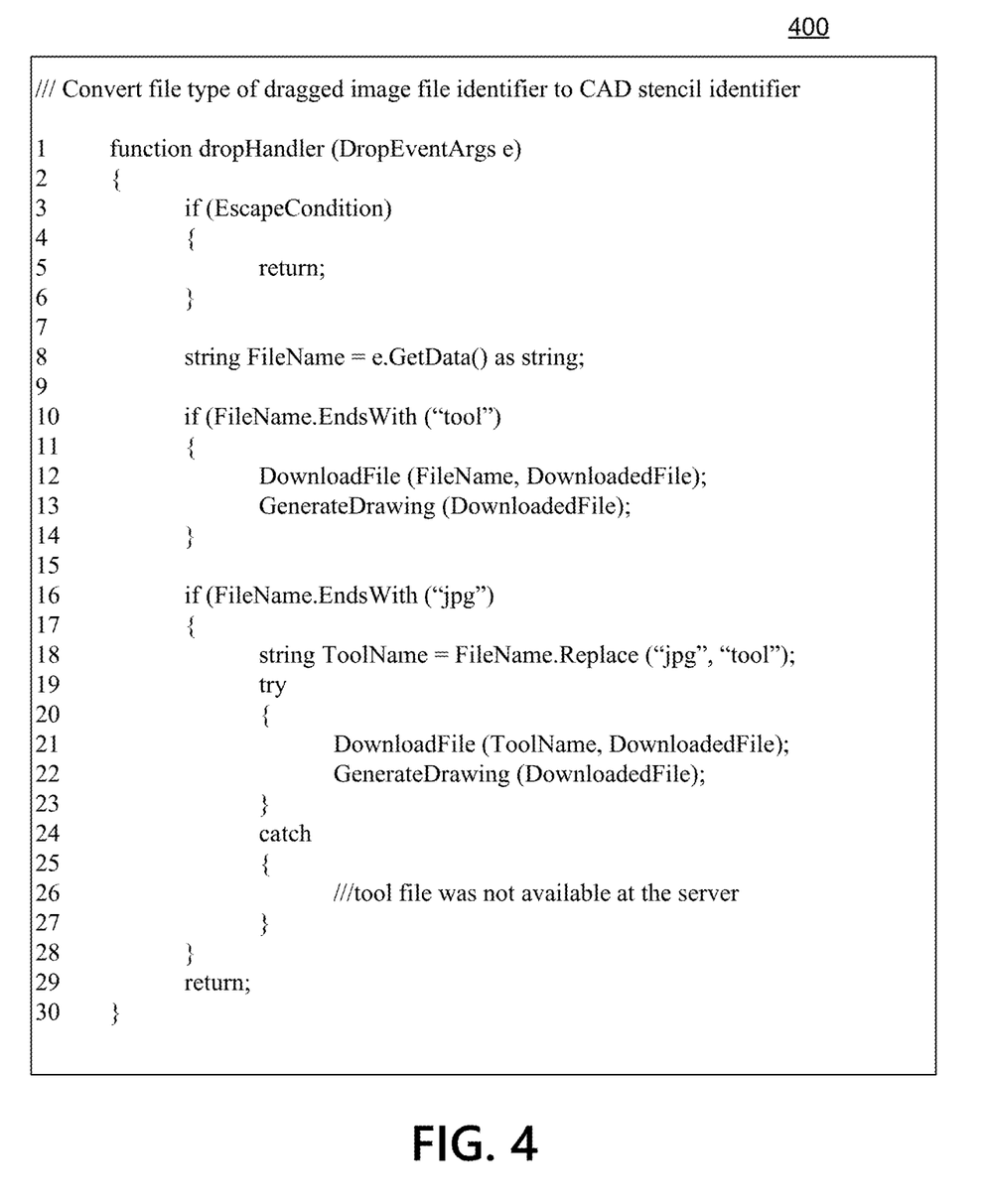
FIG. 4 depicts example computer code in accordance with one or more illustrative aspects discussed herein.

FIG. 4 depicts pseudocode 400 according to an implementation of one or more aspects described herein. The pseudocode 400 depicted in FIG. 4 may convert a file type extension of an image file identifier to a CAD stencil identifier in response to a drag/drop operation. At line 1, a drop handler function is defined to accept drop event arguments. The drop handler function may be registered as an event handler for drag and drop operations associated with a CAD application, such as CAD application 230 or 330.

At lines 3-6, the drop handler may determine if an escape condition is met, and may return if so. For example, if the user is holding down a particular key on the keyboard, such as an "ALT" or more particularly a "LEFT-ALT" key, the system may determine that the user does not want the file name conversion performed and instead intends for the image file URL to be dropped into the CAD drawings.

At lines 10-14, the drop handler may determine if a URL included in the event parameters already refers to a secondary design file, such as a .tool file. If so, no further processing of the URL may be required, and the CAD application may retrieve the CAD stencil/schematic and generate the CAD drawing based on the CAD stencil/schematic data.

At line 16, the drop handler may determine if the URL included in the event parameters refers to an image file type (or other non-CAD file type). If the file type is .jpg or other unsuitable file type, the event handler may proceed to adjust the URL to identify the secondary design file.

At line 18, the drop handler may replace the image file type extension with the proper CAD file type extension. For example, a file type extension of ".jpg" (indicating an image file) may be replaced with ".tool" (indicating an OSAAP .tool file corresponding to CAD schematic data).

At lines 19-27, the drop handler may attempt to retrieve the CAD stencil/schematic data corresponding to the dragged image. Because CAD application 330 may not control whether a tool supplier (or other web site provider) actually stored the corresponding CAD data with the image data, the drop handler may not be able to properly retrieve the CAD data (e.g., because it is not available in the expected location). In this case, the drop handler may perform suitable error handling, such as by displaying a prompt for the user or attempting to locate the CAD data in other locations.

Although some implementations herein have been described with reference to images and secondary CAD design files, aspects of the disclosure find application in other circumstances as well. Aspects may apply in any scenario where data of one file type is dragged from a first application to a second application where another file type is required or preferred. For example, a web site may be used to provide music audio files. The website may include an album cover or other image related to the audio file. When a user drags the image to a music player, an even handler of the music player (according to aspects herein) may replace the image file type extension in the URL of the dragged image with an audio file type extension, thereby allowing the music player to retrieve the audio file corresponding to the image displayed in the browser.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   intercepting, by a first application, a drag and drop event in response to an image resource used in a second application being dragged to the first application, wherein the image resource corresponds to a first product and is in a first file type;
   determining, by the first application and based on the drag and drop event, a first resource identifier associated with the image resource;
   replacing, by the first application, a first file type extension of the first resource identifier with a second file type extension to generate a second resource identifier, wherein the second file type extension corresponds to a different second file type used by the first application; and
   retrieving, by the first application and in response to the drag and drop event, a second resource based on the generated second resource identifier, wherein the second resource comprises information in the second file type that corresponds to the first product,
   wherein the image resource is stored on a first server and the second resource is stored on the same first server.

2. The method of claim 1, wherein the first application is a computer-aided design (CAD) application.

3. The method of claim 2, wherein:
   the first file type extension indicates that the image resource has an image file type, and
   the second file type extension indicates that the second resource has a computer-aided design (CAD) file type.

4. The method of claim 2, wherein:
the second resource comprises a stencil that corresponds to the first product.

5. The method of claim 2, further comprising:
generating, by the first application and automatically based on retrieving the second resource, a CAD drawing comprising at least one element corresponding to the first product.

6. The method of claim 1, wherein the second application is a web browser application.

7. The method of claim 1, wherein the first resource identifier and the second resource identifier are each uniform resource locators (URLs).

8. The method of claim 1, wherein the image resource and the second resource are stored in a same directory location on the first server.

9. The method of claim 1, further comprising:
registering, by the first application, a drop event handler associated with the drag and drop event,
wherein the intercepting the drag and drop event comprises intercepting, by the drop event handler associated with the first application, the drag and drop event.

10. The method of claim 1, wherein the first resource identifier and the second resource identifier indicate that the image resource and the second resource are stored in different subfolders on the same first server.

11. An apparatus comprising:
one or more processors; and
memory storing instructions that, when executed by the one or more processors, cause the apparatus to:
intercept, by a first application, a drag and drop event in response to an image resource used in a second application being dragged to the first application, wherein the image resource corresponds to a first product and is in a first file type;
determine, by the first application and based on the drag and drop event, a first resource identifier associated with the image resource;
replace, by the first application, a first file type extension of the first resource identifier with a second file type extension to generate a second resource identifier, wherein the second file type extension corresponds to a different second file type used by the first application; and
retrieve, by the first application and in response to the drag and drop event, a second resource based on the generated second resource identifier, wherein the second resource comprises information in the second file type that corresponds to the first product,
wherein the first resource identifier and the second resource identifier indicate that the image resource and the second resource are stored on a same first server.

12. The apparatus of claim 11, wherein the first application is a computer-aided design (CAD) application.

13. The apparatus of claim 12, wherein:
the first file type extension indicates that the image resource has an image file type,
the second file type extension indicates that the second resource has a computer-aided design (CAD) file type, and
the second resource comprises a stencil that corresponds to the first product.

14. The apparatus of claim 12, wherein the instructions, when executed by the one or more processors, further cause the apparatus to:
generate, by the first application and automatically based on retrieving the second resource, a CAD drawing comprising at least one element corresponding to the first product.

15. The apparatus of claim 12, wherein the first resource identifier and the second resource identifier are each universal resource locators (URLs).

16. The apparatus of claim 15, wherein:
the image resource and the second resource are stored in a same directory location on the first server.

17. One or more non-transitory computer-readable media storing instructions that, when executed by at least one processor, cause a computer system to perform steps comprising:
intercepting, by a computer-aided design (CAD) application, a drag and drop event in response to an image resource used in a web browser application being dragged to the CAD application, wherein the image resource corresponds to a first product and is in a first file type;
determining, by the CAD application and based on the drag and drop event, a first uniform resource locator (URL) associated with the image resource;
replacing, by the CAD application, a first file type extension of the first URL with a second file type extension to generate a second URL, wherein the second file type extension corresponds to a different second file type used by the CAD application;
retrieving, by the CAD application and in response to the drag and drop event, a stencil resource corresponding to the first product based on the generated second URL; and
generating, by the CAD application and automatically based on retrieving the stencil resource, a CAD drawing comprising at least one element corresponding to the first product,
wherein the image resource is stored on a first server and the stencil resource is stored on the same first server.

18. The computer-readable media of claim 17, wherein the image resource and the stencil resource are stored in a same directory location on the first server.

19. The computer-readable media of claim 17, wherein the instructions, when executed by the at least one processor, further cause the computer system to perform further steps comprising:
registering, by the CAD application, a drop event handler associated with the drag and drop event,
wherein the intercepting the drag and drop event comprises intercepting, by the drop event handler associated with the CAD application, the drag and drop event.

20. The computer-readable media of claim 17, wherein the first URL and the second URL indicate that the image resource and the stencil resource are stored in different subfolders on the same first server.

* * * * *